Oct. 13, 1959 A. MACOVSKI 2,908,748

COLOR TELEVISION CHROMA CONTROL SYSTEM

Filed Sept. 14, 1954 2 Sheets-Sheet 1

INVENTOR.
ALBERT MACOVSKI
BY
[signature]
ATTORNEY

COLOR TELEVISION CHROMA CONTROL SYSTEM

Filed Sept. 14, 1954

2 Sheets-Sheet 2

INVENTOR.
ALBERT MACOVSKI
BY
ATTORNEY 2,908,748

COLOR TELEVISION CHROMA CONTROL SYSTEM

Albert Macovski, Massapequa, N.Y., assignor to Radio Corporation of America, a corporation of Delaware Application September 14, 1954, Serial No. 455,957

12 Claims. (Cl. 178—5.4)

The present invention relates to circuits for providing both automatic and manual chroma control in color television receivers.

In the modern color television signal which conforms to standards approved by the Federal Communications Commission on December 17, 1953, at least four types of picture information are transmitted from the signal source. The first type of picture information relates to deflection scanning information. A second type of picture information represents the brightness or luminance signal which conveys the monochrome picture information. A third type of picture information represents the chrominance signal containing color-difference signal information; the chrominance signal is transmitted in the form of a suppressed-carrier color-modulated subcarrier wave having a mean frequency of 3.58 mcs.

The color-difference signal information present in the chrominance signal is susceptible to demodulation by the processes of synchronous detection; the phase of each color-difference signal is related to a fixed phase which is hereinafter referred to as the reference phase.

In order to provide reference phase signal information in a color television receiver a fourth type of picture information is transmitted. This fourth type of picture information is in the form of color synchronizing bursts of approximately eight cycles of a wave having a frequency of 3.58 mcs. These color synchronizing bursts are transmitted on the back porch of the horizontal synchronizing pulses.

In the color television receiver, channels must be provided for each of the aforementioned types of picture information; as will be shown later in these specifications, the deflection scanning information is applied to suitable deflection circuits, the luminance signal is amplified in luminance channels having suitable delay and bandwidth characteristics, and the chrominance information is amplified and demodulated in chrominance channels which are operated in conjunction with a reference signal source whose phase is prescribed by the phase of the color synchronizing burst.

It is important that in the operation of a color television receiver, the amplitude of the chrominance signal being applied to the color-difference demodulation circuits be independent of the magnitude of the chrominance signal which is applied to the input of the chrominance circuits.

It is, therefore, an object of this invention to provide an improved automatic chroma control circuit for use in a color television receiver.

It is still another object of this invention to provide a manual chroma control which will function is conjunction with the automatic chroma control circuit in a color television receiver.

It is yet another object of this invention to provide an improved means whereby the chrominance signal applied to the color-difference signal demodulators in a color television receiver is held at a predetermined amplitude level which is relatively independent of the magnitude of the chrominance signal which is applied to the input circuits of the chrominance channels.

It is a still further object of this invention to provide a burst synchronizing signal of constant amplitude to the phase detector.

According to one form of the invention, the color synchronizing burst is amplified with the chrominance signal in the chrominance amplifiers; it is then separated from the chrominance signal and applied to a phase discriminator circuit where it is compared with the signal provided by the reference subcarrier oscillator. The phase discriminator provides a phase-difference-indicating voltage, which measures any phase difference existing between the color synchronizing burst and the phase of the signal provided by the reference subcarrier oscillator, and which may be used for synchronizing the phase of the reference subcarrier oscillator. The phase discriminator also contains circuits which serve as detectors of the color synchronizing burst to yield a control voltage which is indicative of the amplitude level of the color synchronizing burst. This control voltage may then be utilized to control the gain of one or more of the chrominance amplifiers so that when the amplitude of the color synchronizing burst increases, for example, the gain of the chrominance amplifier to which the control voltage is applied is caused to decrease and vice versa. Means are provided for adjusting the gain of the chrominance amplifier to a prescribed level during the duration interval of each color synchronizing burst. As a result, the amplitude of the control voltage will be indicative of burst amplitude and will be only partially dependent on the gain of the chrominance amplifier from scanning line interval to scanning line interval due to variations in the amplitude of the color synchronizing bursts. In this way the amplitude of both the color synchronizing burst and the chrominance signal produced at the output of the chrominance amplifiers is maintained at a substantially constant level which is independent of the amplitude of the chrominance signal applied to the input of the chrominance channels.

In another form of the invention, which provides both manual and automatic chroma control, one of the chrominance amplifiers is subjected to a biasing action by a series of gate pulses. The gate pulses have the duration interval of at least the color synchronizing bursts, and are applied to a potentiometer, which in conjunction with a capacitor, applies a resultant biasing-pulse voltage to the chrominance amplifier. The gate pulse tends to increase the gain of the chrominance amplifier during the duration interval of the gate pulse; the resulting increase in the amplitude of the color synchronizing burst immediately increases the negative reference voltage provided by the phase discriminator; this increase in negative reference voltage in turn reduces the gain of the chrominance amplifier. Thus, by changing the relative gain between the color synchronizing burst and the chrominance signal in the chrominance channels by use of a pulse of adjustable amplitude, and by keeping the amplitude of the color synchronizing burst substantially constant by use of the mentioned automatic gain control system which involves the color synchronizing burst only, the amplitude level of the chrominance signal at the output of the chrominance channels may be manually controlled in a manner which maintains the advantages of automatic chroma control.

Incidental objects of this invention will become apparent upon a reading of the following specifications and a study of the figures where:

Figure 1:
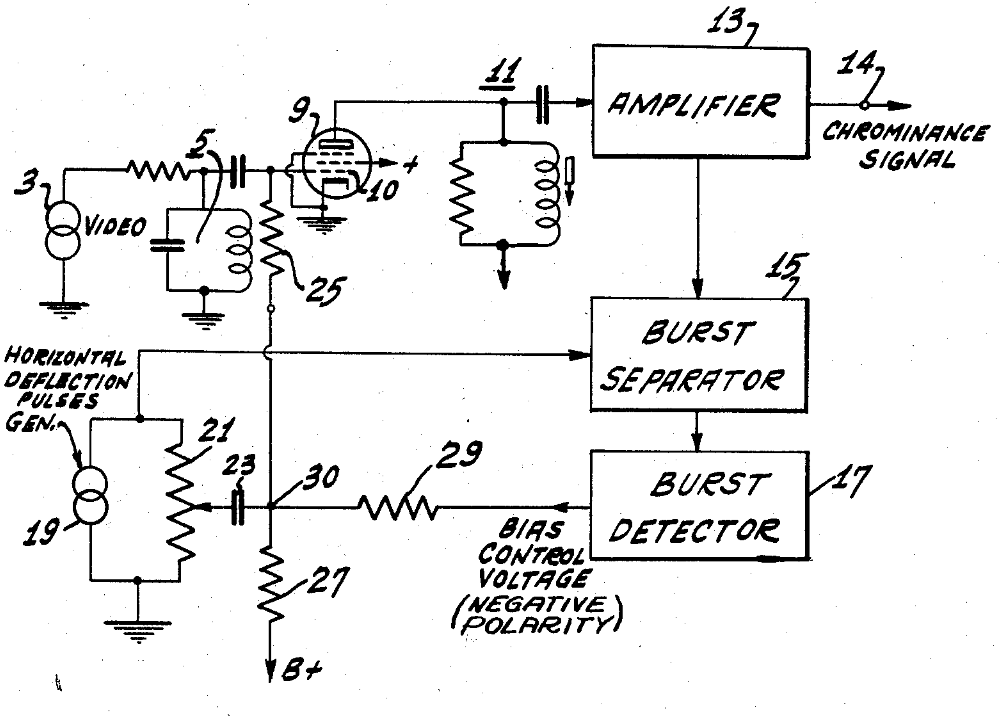
Fig. 1 is a block diagram of one form of the manual and automatic chroma control circuit which forms one embodiment of the present invention.

Figure 1 is a diagram of one embodiment of the present invention. The source of color television signals is designated by the video generator 3 which presents color television signals to the resonant circuit 5 which has frequency characteristics which are suitable for developing voltages only in the frequency range of the chrominance signal; this frequency range includes the frequency of the color synchronizing burst. The chrominance signal, as developed across the resonant circuit 5, is presented to the control grid of the amplifier tube 9 with the amplified signal developed across the output resonant circuit 11. The amplifier tube 9 derives its bias potential from the voltages developed at terminal 30; this bias potential will determine the gain of the amplifier tube 9. It is desired that the gain of amplifier tube 9 be such that a chrominance signal and also color synchronizing burst signal developed in the output resonant circuit 11 be of substantially constant amplitude level regardless of the amplitude level of the chrominance signal developed across the resonant circuit 5. This constitutes automatic chrominance signal amplitude control or as it is herewith termed automatic chroma control. It is also desired that means be provided whereby manual adjustment of the amplitude of the chrominance signal developed in the output resonant circuit 11 be provided.

The amplified chrominance signal and color synchronizing burst as developed across the output resonant circuit 11 is then passed through the amplifier 13 to the output terminal 14. In addition the combined chrominance signal and color synchronizing burst signal is impressed on the burst separator 15 to which is also applied a series of gate pulses or horizontal deflection pulses, the latter being produced by the horizontal deflection pulse generator 19. The burst separator 15 functions as a gate circuit with the gate open during at least the duration interval of the color synchronizing bursts; the separated color synchronizing bursts are then impressed on the burst detector 17 which provides a control signal which is indicative of the amplitude of the color synchronizing bursts. The control signal for automatic chroma control operation is a negative voltage whose absolute amplitude varies proportionally to the amplitude of the color synchronizing burst provided by the burst separator 15. By use of the voltage divider network made up of the resistance 29 and the resistance 27 to which is provided a bias voltage of positive polarity, the control voltage, as furnished by the burst detector 17 and changed in amplitude by the bias voltage from resistance 27, is applied to the terminal 30 and therefrom to the control grid 10 of the amplifier tube 9. As the amplitude of the color synchronizing burst as applied to the control grid 10 increases, for example, the control voltage applied to the terminal 30 increases thereby decreasing the gain of the amplifier tube 9; the amplitude of the color synchronizing burst, and, therefore, the chrominance signal as developed across the output resonant circuit 11 is held at a substantially constant level. The same follows for the case where the amplitude of the color synchronizing burst as applied to the control grid 10 decreases in amplitude; the control voltage provided by the burst detector will become less negative and the gain of amplifier tube 9 will increase thereby holding the value of the color synchronizing burst, and therefore, of the chrominance signal developed in the output resonant circuit 11, at the previously mentioned substantially constant level.

It is also desired that automatic and manual control, used singly or in combination, be provided of the amplitude of the chrominance signal as produced at the output resonant circuit 11 and at the output terminal 14. This is accomplished according to one feature of the present invention by developing horizontal deflection pulses across the potentiometer 21 whose movable contact is connected by way of the condenser 23 to the terminal 30 which is in turn coupled to the control grid 10 of the amplifier tube 9. A positive pulse having a duration interval at least that of the color synchronizing burst is therefrom added to the direct current bias which is applied to the control grid 10. This positive pulse tends to adjust the gain of the amplifier tube 9 during the burst duration interval, to a value which is either independent or partially independent of the gain of the amplifier tube during the preceding scanning interval so that the developed control voltage will be indicative of only the burst amplitude and the amplitude of the horizontal deflection pulses. Manual chroma control is obtained as follows: as the sliding contact of potentiometer 21 is, for example, varied to increase the amplitude of the horizontal deflection pulses, the amplitude of the separated color synchronizing burst applied to the burst detector 17 immediately increases; this increase causes the control voltage from the burst detector to become more negative and thereby reduce the gain of the amplifier tube 9. The chrominance output is therefore reduced since the increased negative bias on the control grid of amplifier tube 9 is maintained during the entire scanning line succeeding the color synchronizing burst. Thus, changing the relative gain of the amplifier tube 9 between the color synchronizing burst and the chrominance signal by use of pulses of adjustable amplitude provides means for keeping the amplitude of the separated color synchronizing burst substantially constant by use of the feedback system which involves the color synchronizing burst only; the chrominance signal may be manually controlled for amplitude without varying the amplitude of the color synchronizing burst thereby yielding the functions of both manual and automatic chrominance signal amplitude control. The horizontal deflection pulses, used in the circuit described may be also considered as causing the amplifier tube 9 to explore the incoming video signal during burst time.

Figure 2:
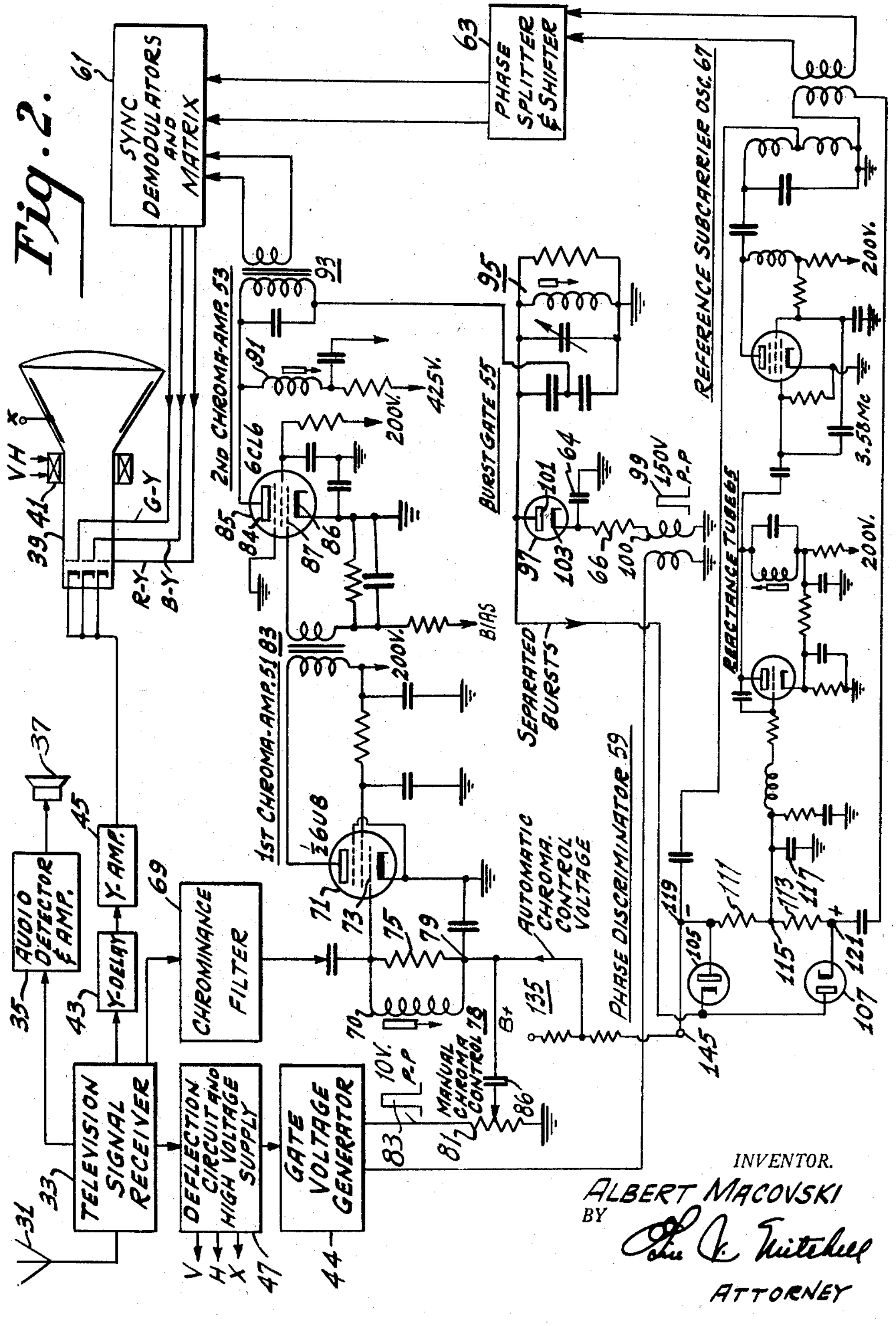
Fig. 2 shows a diagram of a color television receiver including the schematic diagram of an automatic and manual chroma control circuit which are incorporated into a circuit including a first and a second chroma amplifier, a burst gate and a phase discriminator.

Consider now, the operation of the color television receiver circuit shown in Fig. 2. The recovered color television signal as yielded by the television signal receiver 33, contains the deflection synchronizing signals, the luminance information, the chrominance signal, the color synchronizing burst and, contains the audio information which has been transmitted on a frequency modulated subcarrier 4½ mcs. removed from the video carrier.

Utilizing, for example, an intercarrier sound circuit, the audio information is recovered and amplified in the audio detector and amplifier 35 and applied to the output loud speaker 37.

The television signal receiver 33 is coupled to the deflection circuits and high voltage generator 47, which in response to the deflection synchronizing signals, supplies vertical and horizontal deflection signals to the yokes 41 in addition to a high unidirectional voltage which is applied to the ultor of the color image reproducer 39. In addition, the deflection circuits and high voltage generator 47 is utilized to furnish excitation for the gate voltage generator 44 which provides gate voltages having substantially duration intervals at least that of the color synchronizing bursts and having the potentials and polarities required for the specific applications for which the gate voltages are designed.

In another branch of the color television receiver the recovered color television signal, in the form of the luminance signal, is passed through the Y delay line 43 and Y amplifier 45 wherein the luminance signal is amplified to a suitable level and applied to the cathodes of the color image reproducer 39.

The function of the chrominance circuit is to provide color-difference signal information from the color television signal. These color-difference signals will be impressed on suitable control electrodes of the color image reproducer 39 so that signal addition of the color television signal information is achieved within the color image reproducer. In other forms of color image receivers, auxiliary adder circuits may be used for the addition of signals of the luminance and color-difference signal variety with the resulting component color reference signals then applied to suitable control electrodes of a color image reproducer which can utilize this type of signal directly.

Consider now the general operation of the circuits which filter and amplify the chrominance signal and provide recovery of the color-difference signals; some of these circuits are shown in block diagram in Figure 2; those circuits which illustrate the present invention are illustrated in schematic form.

The chrominance signal is filtered from the color television signal by the chrominance filter 69; the band pass of the chrominance filter may be typically for the frequency range from 2 to 4.2 mcs. or from 3 to 4.2 mcs. The chrominance signal is thereupon amplified in the first chroma amplifier 51 and the second chroma amplifier 53. The amplified chrominance signal is then applied to the sync demodulators and matrix 61. At the same time a reference subcarrier oscillator 67 is controlled in frequency and phase by the reactance tube 65 and a phase discriminator 59. The burst gate 55 separates the color synchronizing burst from the chrominance signal, and applies the color synchronizing burst to the phase discriminator 59. The phase of the color synchronizing burst is then compared to the phase of the signal provided by the reference subcarrier oscillator 67. Should the phase of the signal provided by the reference subcarrier oscillator 67 differ from or be the same as that prescribed by the color synchronizing burst, the phase discriminator 59 will provide a phase-difference-indicating signal which is then applied to the reactance tube 65; the reactance tube 65 adjusts the frequency and phase of the reference subcarrier oscillator 67 to the phase and frequency prescribed by the color synchronizing burst.

The output of the reference subcarrier oscillator 67 is impressed on the phase splitter and shifter 63 which provides synchronous demodulating signals to the sync demodulators and matrix 61 where, utilizing circuits which accomplish synchronous demodulation and signal addition where color difference signals of the type, R—Y, B—Y and G—Y signals, is the luminance signal, are developed and therefrom applied to the control electrodes of the color image reproducer 39.

Consider now the operation of the automatic chroma control circuit which includes the first chroma amplifier 51, the second chroma amplifier 53, the burst gate 55, the phase discriminator 59, the reactance tube 65 and the reference subcarrier oscillator 67. The color television signal, as provided by the television signal receiver 31, is applied to the filter network 69 which has a bandpass commensurate with the type of performance required of the color television receiver. Should the full utilization of the color-difference signal information be desired in the color television receiver, the filter network 69 will be designed to have a pass band from substantially 2 to 4.2 mcs.; should component color-difference signal information having an upper frequency limit of approximately ½ mc. be desired, then the filter network 69 should be designed to have a pass band from substantially 3 to 4.2 mcs.

The chrominance signal as filtered by the filter network 69 is then applied to the control grid 73 of the amplifier tube 71 in the first chroma amplifier 51. At the terminal 79, bias voltages are produced respectively by the automatic chroma control circuits and the manual control circuits which will be utilized to control the gain of the amplifier tube 71 in a manner which is commensurate with the requirements of these circuits. The output signal of the first chroma amplifier 51 is then caused to be developed across the output circuit 83 and therefrom presented at the control grid 87 of the amplifier tube 85 of the second chroma amplifier 53.

The second chroma amplifier 53 uniquely provides at least two functions which are very useful in the design and operation of color television receivers; i.e., the chrominance signal is provided at suitable amplification to a desired level and means are also provided whereby the color synchronizing burst is gated from the chrominance signal so that it may be applied to a suitable automatic frequency control circuit which in turn adjusts the phase of a local reference subcarrier oscillator to a phase and frequency prescribed by the color synchronizing burst.

By proper design, the phase discriminator 59, fulfills the function of yielding a phase-difference-indicative voltage which describes the phase difference between the color synchronizing burst and the phase of the signal provided by the reference subcarrier oscillator 67; the phase discriminator is also utilized to provide a reference signal which is indicative of the amplitude level of the color synchronizing burst which has been amplified in the first chroma amplifier 51, and in the second chroma amplifier 53. This reference voltage is a negative continuous voltage which is produced at the terminal 119; this negative continuous voltage is applied through a voltage divider and applied to the control grid 73 of the amplifier tube 71 in a manner whereby as the amplitude of the color synchronizing burst increases, for example, the gain of the first chroma amplifier 51 is caused to decrease and vice versa.

The change of the gain of the first chroma amplifier 51 relative to a change in amplitude of the color synchronizing burst should be adjusted so that regardless of the amplitude of the chrominance signal which is applied by the filter 69 to the control grid 73 of the amplifier tube 71 in the first chroma amplifier 51, the amplitude of the chrominance signal as delivered by the second chroma amplifier 53 to the sync demodulators and matrix 61, should remain substantially constant.

The following is a more detailed discussion of some of the circuit aspects which are ingeniously utilized to provide color synchronizing burst separation in the development of the bias voltage which is used for both the automatic chroma control and the manual chroma control.

Since the filter network 69 has a pass band from at least 3 mcs. to 4.2 mcs., the color synchronizing burst will pass through the first chroma amplifier 51 and the second chroma amplifier 53 along with the chrominance signal. In the output circuit of the second chroma amplifier 53, means are provided for uniquely separating the color synchronizing burst from the chrominance signal in a very simple and straightforward manner. It is particularly appropriate that the color synchronizing burst be separated from the chrominance signal in the output of the second chroma amplifier 53; since the color synchronizing burst conveys a reference phase relative to the phase which distinguishes each of the color-difference signals contained in the color modulated subcarrier, the phase differences between the various color-difference signals and the color synchronizing burst are carefully maintained by simultaneously amplifying both the color synchronizing burst and the color modulated subcarrier before each is applied to its respective circuits.

In the output stage of the second chroma amplifier 53, an output circuit which is hereinafter referred to as the chroma tank 93 is connected in series with the burst responsive resonant circuit which is referred to as the burst tank 95. The burst tank 95 is tuned to the burst frequency and has a high impedance at that frequency. The chroma tank 93 has a bandwidth commensurate with that associated with the particular color-difference signals which are to be utilized in the sync demodulators and matrix 61 to follow. Since the chroma tank 93 and the burst tank 95 are in series, the output signal of the second chroma amplifier 53 will appear across both the chroma tank 93 and the burst tank 95 to an extent dependent upon the impedance characteristics of both of the tanks.

To permit accurate and simple means of burst separation, a diode 97, having an anode 101 and a cathode 103 is connected essentially in shunt with the burst tank. The diode 97 is caused to function in conjunction with the decay circuit consisting of the resistor 66 and the capacitor 64, in a manner whereby when the diode 97 is conducting it presents a substantial load to the burst tank 95 and the second chroma amplifier 53, for all practical purposes, delivers the chrominance signal to only the chroma tank 93. A gate pulse 99 having approximately 150 volts peak to peak and a duration interval during the horizontal retrace time which is at least that of the color synchronizing burst, is applied to the cathode of the diode 97 by way of pulse transformer 100. The polarity of the gate pulse 99 is such that at least during the duration interval of the color synchronizing burst, the diode 97 is caused to cease conducting; since the impedance of the burst tank 95 is designed to be greater than that of the chroma tank 93, the color synchronizing burst will then appear principally across the burst tank 95. The diode 97 and its associated decay circuit rectifies the gate pulse 99 to provide a diode bias current which, between pulses, is suitable for providing the loading or attenuation of the burst tank 53 which is required.

The preceding paragraph has described a unique method of providing burst gate separation in the output circuit of the second chroma amplifier 53. The circuit involving the diode 97 and the burst tank 95 is hereinafter referred to as the burst gate 55. One aspect of the overall circuit associated with the second chroma amplifier 53 must also be considered; if the synchronous demodulators which are incorporated in the sync demodulators and matrix 61 are of the diode or triode variety such as are described, for example, in the paper entitled, "Color Television Signal Receiver Demodulators" by D. H. Pritchard and R. N. Rhodes as published in June 1953 issue of The RCA Review, it is possible that some of the synchronous demodulating signal provided by the reference subcarrier oscillator 67 will be induced back into the chroma tank 93 and the burst tank 95. One manner of eliminating this is to install the resonant circuit 91 into the output circuit of the second chroma amplifier tube 85 in a manner to tune out the capacity which exists from the anode 84 of the second chroma amplifier tube 85 to ground. This tuning out is adjusted to be accomplished at the frequency of the color synchronizing burst and provides the effect of coupling a high impedance between the burst tank 95 and the chroma tank 93 thereby making the burst tank output independent of the voltage across the chroma tank 93. In this way any signal from the reference subcarrier oscillator 67, which may be reintroduced into the second chroma amplifier 53, will not be caused to appear across the burst tank 95 in a manner which would shift the apparent reference phase of the color synchronizing burst.

The color synchronizing burst as provided by the burst gate 55 during the time interval of the color synchronizing burst is applied to the phase discriminator 59 which also accepts reference signals from the reference subcarrier oscillator 67. The phase discriminator 59 utilizes a pair of diodes 105 and 107 with the cathode of diode 105 and the anode of diode 107 accepting the color synchronizing burst from the burst gate 55. The anode of diode 105 and the cathode of diode 107 are applied with properly phased reference signals from the reference subcarrier oscillator 67, and are associated with a decay network including the resistors 111 and 113 whose mid connection 115 is coupled to ground by way of capacitor 117. The operation of the circuit follows from well known principles which are associated with phase and frequency discriminators; the comparison of the color synchronizing burst, and the reference signals applied to the diodes 105 and 107 will produce an integrated continous voltage across the condenser 117; this integrated continuous voltage will be indicative of any phase difference which exists between the color synchronizing burst and the reference signal provided by the reference subcarrier oscillator 67. The integrated continuous voltage provided by the phase discriminator 59 is applied to the reactance tube 65 which in turn adjusts the frequency and phase of the reference subcarrier oscillator 67 to that prescribed by the color synhcronizing burst.

The phase discriminator 59 in the particular type of circuit utilized, will also develop a signal of negative polarity at the anode of the diode 105 and, therefore, at the terminal 119. This signal is a voltage of negative polarity which is indicative of the amplitude of the color synchronizing burst; a corresponding voltage of positive polarity will be developed at the terminal 121 which is connected at the cathode of the diode 107. The negative voltage provided at the terminal 119 of the phase discriminator 59 is then applied through the potential divider 135 to the terminal 79 which applies a negative bias voltage to the control grid 73 of the first chroma amplifier 51.

This negative bias voltage is then used for gain control of the first chroma amplifier 51 in a manner whereby should the amplitude of the color synchronizing burst increase, the gain of the first chroma amplifier 51 will be caused to decrease; should the color synchronizing burst provided at the output of the second chroma amplifier 53 decrease in amplitude, the phase discriminator 59 will provide a less negative bias voltage at the terminal 119 which will in turn yield an increase in the gain of the first chroma amplifier 51.

An additional feature of the automatic chroma control circuit involves the aforementioned pulsing of the gain of the first chroma amplifier during burst time; this feature also provides manual control of the amplitude of the chrominance signal in a manner whereby the features of automatic chroma control are still maintained, but whereby the magnitude of the chrominance signal developed across the chroma tank 93 may be adjusted in accordance with personal preference by the user of the color television receiver.

The chroma control circuit utilizes a potentiometer 81. The potentiometer 81 is applied with a gate pulse 83 having substantially 10 volts peak to peak and being positive in polarity with respect to ground; the gate pulse 83 is generated by the gate voltage generator 44. The sliding contact of the potentiometer 81 is coupled through the capacitor 80 to the terminal 79 which is coupled to the control grid 73 of the first chroma amplifier tube 71. Maximum chrominance signal output of the second chroma amplifier 53 is achieved when the sliding contact of the potentiometer 81 is at the grounded end of the potentiometer. As this sliding contact is advanced from ground, a positive pulse is added to the bias on the control grid 73 of the first chroma amplifier tube 71. This tends to increase the gain of the first chroma amplifier 51 during the time intervals of the color synchronizing burst, but the amplitude of the color synchronizing burst developed across the burst tank 95 immediately increases slightly to increase the negative bias developed at the terminal 119 in a manner which decreases the gain of the first chroma amplifier 51 during the entire scan period following the gate pulse 83.

Thus, by controlling the relative gain of the first chroma amplifier 51 during the burst time interval by use of the pulses yielded by the manual chroma control, the chrominance signal amplitude at the output of the second chroma amplifier 53 is manually controlled in a manner which maintains the full advantages of automatic chroma control. The circuit has an additional advantage in that the development of a color synchronizing burst of substantially constant amplitude at the burst tank 95, is desirable in order to assure constant phase sensitivity of the phase discriminator 59 which is associated with the reactance tube 65 for controlling the phase of the reference subcarrier oscillator 67.

The invention claimed is:

1. In a color television receiver of the type adapted to receive a color television signal including a chrominance signal and color synchronizing bursts, said color synchronizing bursts having predetermined frequency and phase characteristics and having predetermined time intervals, said color television receiver including a chrominance channel in which said chrominance signal is amplified, chrominance channel gain control means comprising in combination, a chrominance amplifier included in said chrominance channel and having an input circuit and an output circuit and a gain control circuit, and utilized to amplify both said chrominance signal and said color synchronizing bursts, a color synchronizing burst separator circuit coupled to said output circuit operatively connected to separate said color synchronizing bursts from said chrominance signal, a reference signal source generating a signal, having a frequency substantially that of said color synchronizing bursts, a detector circuit coupled to said color synchronizing burst separator to develop a reference bias which is indicative of the amplitude of the separater color synchronizing bursts, means for using said reference bias to said gain control circuit to control the gain of said chrominance amplifier, and means to alter the gain of said chrominance signal amplifier for the duration interval of each color synchronizing burst.

2. In a color television receiver of the type adapted to receive a color television signal including a chrominance signal and color synchronizing bursts, said color synchronizing bursts having prescribed frequency and phase characteristics and having predetermined time intervals, said color television receiver including a chrominance channel in which said chrominance signal is amplified, a chrominance channel gain control means comprising in combination, a chrominance amplifier included in said chrominance channel and having an input circuit and an output circuit and a gain control circuit, and utilized to amplify both said chrominance signal and said color synchronizing bursts, a color synchronizing burst separator circuit coupled to said output circuit and adapted to separate said color synchronizing burst from said chrominance signal, a reference signal source to provide a signal having a frequency substantially that of said color synchronizing bursts, a phase comparison device coupled to said color synchronizing burst separator and said reference signal source and operatively connected to provide a reference bias which is indicative of the amplitude of the separated color synchronizing bursts, means for coupling said reference bias to said gain control circuit to control the gain of said chrominance amplifier, and pulser developing means to apply pulses to said gain control circuit to increase the amplitude of the color synchronizing bursts amplified by said chrominance amplifier into said output circuit.

3. In a color television receiver of the type adapted to receive a color television signal including a chrominance signal and color synchronizing bursts, said color synchronizing bursts having prescribed frequency and phase characteristics and having predetermined duration intervals, said color television receiver including a chrominance channel in which said chrominance signal is amplified, chrominance channel gain control means comprising in combination, a chrominance amplifier included in said chrominance channel and having an input circuit and an output circuit and a gain control circuit, and utilized to amplify both said chrominance signal and said color synchronizing bursts, a color synchronizing burst separator circuit coupled to said output circuit and adapted to separate said color synchronizing burst from said chrominance signal, a reference signal source to develop a signal having a frequency substantially that of said color synchronizing bursts, a phase comparison device coupled to said color synchronizing burst separator and said reference signal source and adapted to provide both a phase indicating signal related to the phases of said color synchronizing burst and the signal provided by said reference signal source and also a reference bias which is indicative of the amplitude of the separated color synchronizing bursts, means for coupling said reference bias to said gain control circuit to cause said chrominance amplifier to have gain characteristics bearing prescribed relationship to the amplitude of said color synchronizing bursts, a pulse source adjusted to provide pulses having the duration intervals of said color synchronizing bursts and having a pulse amplitude control device, means for impressing said pulses into said gain control circuit to control the gain of said chrominance amplifier according to the amplitude of said pulses subject to gain control by suitable adjustment of said pulse amplitude control device.

4. In a color television receiver of the type adapted to receive a color television signal including a chrominance signal and color synchronizing bursts, said color synchronizing bursts having predetermined time intervals taking place during horizontal retrace intervals, said color television receiver including a chrominance signal channel, means for causing the chrominance signal appearing at the output circuit of said chrominance channel to be relatively independent of the amplitude of the chrominance signal applied to the input circuit of said chrominance channel, comprising in combination, a chrominance amplifier having an input circuit and an output circuit, a gain control circuit and incorporated to amplify both said color synchronizing burst and said chrominance signal, a color synchronizing burst separation and detection circuit included in said chrominance channels following said chrominance amplifier and including apparatus to develop a reference bias which is related to the amplitude of said color synchronizing burst as amplified in said chrominance amplifier, means for coupling said reference bias to said gain control circuit of said chrominance amplifier to control the gain of said chrominance amplifier, a bias pulse supply means to develop bias pulses having the duration intervals substantially that of said color synchronizing burst, and means to couple said bias pulse to said gain control circuit of said chrominance amplifier to increase the amplification of said chrominance amplifier during the time interval normally allotted to said color synchronizing burst.

5. In a color television receiver of the type adapted to receive a color television signal including a chrominance signal and color synchronizing bursts, said color synchronizing bursts having predetermined time intervals taking place during horizontal retarce intervals, said color television receiver including a chrominance channel in which said chrominance signal is amplified, said chrominance channels having an input circuit and an output circuit, a chrominance channel circuit comprising in combination, a chrominance amplifier having an input circuit and an output circuit, a gain control circuit and incorporated to amplify both said color synchronizing bursts and said chrominance signal, pulse generating means to generate pulses having the duration intervals substantially that of said color synchronizing burst, and means to couple said pulses to said gain control circuit of said chrominance amplifier to increase the amplification of said chrominance amplifier during the time interval normally allotted to said color synchronizing burst.

6. In a color television receiver of the type adapted to receive a color television signal including a chrominance signal and color synchronizing bursts, said chrominance signal having a prescribed frequency range and said color synchronizing bursts having a frequency bearing prescribed location in said frequency range of said chrominance signal and having predetermined duration intervals, said color television receiver including a chrominance signal channel, means for controlling the amplification of said chrominance signal channel comprising in combination, a chrominance amplifier included in said chrominance signal channel and having at least an input circuit and an output circuit, and a gain control circuit, said output circuit including a chrominance tank circuit responsive to the frequency range of said chrominance signal and a burst tank circuit responsive to the frequency of said color synchronizing bursts, a loading circuit coupled to provide a load to said burst tank circuit subject to the potential applied to a control electrode, a first pulse source to provide pulses having substantially the duration interval of said color synchronizing burst, means for coupling said pulse source to said control electrode of said loading circuit to cause intermittent loading of said tank circuit whereby during the duration of said color bursts said color synchronizing bursts are caused to appear principally across said burst tank circuit and in time intervals between said pulses the chrominance signals are caused to appear principally across said chrominance tank circuit, a burst detector circuit, means for coupling said color synchronizing bursts appearing across said burst tank circuit to said burst detector circuit to develop a reference bias which is proportional to the amplitude of the color synchronizing bursts produced across said burst tank circuit, means for coupling said reference bias to said gain control circuit to control the gain of said chrominance amplifier according to a predetermined relationship relative to the amplitude of the color synchronizing burst produced across said burst tank circuit, a pulse source including apparatus to provide pulses having predetermined wave form for the duration intervals of said color synchronizing bursts and having a pulse amplitude control device, said pulse amplitude control device controllable during the operation of said color television receiver, means for applying said pulses to said gain control circuit to cause the amplitude of the separated color synchronizing bursts and the gain of said chrominance amplifier to bear predetermined relationship to the amplitudes of said pulses subject to adjustment of said pulse amplitude control device.

7. In a color television receiver of the type adapted to receive a color television signal including a chrominance signal and color synchronizing bursts, said chrominance signal having a prescribed frequency range and said color synchronizing bursts having a frequency bearing prescribed location in said frequency range of said chrominance signal and having predetermined duration intervals, said color television receiver including a chrominance signal channel, means for controlling the gain of said chrominance signal channel comprising in combination, a chrominance amplifier included in said chrominance signal channel and having at least an input circuit and an output circuit, and a gain control circuit, said output circuit including a chrominance tank circuit responsive to the frequency range of said chrominance signal and a burst tank circuit responsive to the frequency of said color synchronizing bursts, a loading circuit coupled to provide a load to said burst tank circuit subject to the potential applied to a control electrode, a first pulse source including apparatus to provide pulses having substantially the duration interval of said color synchronizing burst, means for coupling said pulses from said pulse source to said control electrode of said loading circuit to cause intermittent loading of said burst tank circuit whereby during the duration of said color bursts said color synchronizing bursts are caused to appear principally across said tank circuit and in time intervals between said pulses said chrominance signal is caused to appear principally across said chrominance tank circuit, a reference signal oscillator having a frequency substantially that of said color synchronizing burst, a phase comparison circuit coupled between said burst tank circuit and said reference signal source and operatively connected to develop a phase difference indicating signal which is indicative of any phase and frequency differences existing between said color synchronizing burst and the output of said reference signal source and also a reference bias which is indicative of the amplitude of the color synchronizing burst produced across said burst tank circuit, means for coupling said reference bias to said gain control circuit to control the gain of said chrominance amplifier according to a predetermined relationship relative to the amplitude of said color synchronizing bursts appearing across said burst tank circuit, a pulse source including apparatus to provide pulses having the duration intervals of said color synchronizing bursts and having a pulse amplitude control device, controllable during the operation of said color television receiver, means for applying said pulses to said gain control circuit to cause the amplitude of the separated color synchronizing bursts and therefore the gain of said chrominance amplifier to bear predetermined relationship to the amplitudes of said pulses subject to gain control by suitable adjustment of said pulse amplitude control device.

8. In a color television receiver adapted to receive a signal wherein a chrominance signal occurs during line trace time and a color synchronizing burst occurs during retrace time, a chrominance control system comprising, a chrominance and burst amplifier, a burst separator coupled to the output of said amplifier, a burst amplitude detector coupled to the output of said burst separator to provide a control signal output having a time constant longer than one line trace interval, means to couple the output of said burst amplitude detector to said amplifier to control the gain thereof during both trace time and retrace time, a source of pulses occurring at the time of said bursts and having a manually controllable amplitude, and means to couple the output of said source of pulses to said amplifier to increase the gain thereof during bursts, whereby the burst output of said amplifier is automatically maintained at a substantially constant level independent of said manually controlled pulses, and the chrominance signal output of said amplifier is automatically maintained at a level varying inversely with the amplitude of said manually controlled pulses.

9. In a color television receiver adapted to receive a signal wherein a chrominance signal occurs during line trace time and a color synchronizing burst occurs during retrace time, a chrominance control system comprising, a chrominance and burst amplifier, a burst separator coupled to the output of said amplifier, a burst amplitude detector coupled to the output of said burst separator to provide a control signal output having a time constant longer than one line trace interval, means to couple the output of said burst amplitude detector to said amplifier to control the gain thereof during both trace time and retrace time, a source of pulses occurring at the time of said bursts, and means to couple the output of said source of pulses to said amplifier to increase the gain thereof during bursts, whereby the burst and chrominance outputs of siad amplifier are automatically maintained at different predetermined levels.

10. In a color television receiver adapted to receive a signal wherein a chrominance signal occurs during line trace time and a color synchronizing burst occurs during retrace time, an automatic and manual chrominance control comprising, a chrominance and burst amplifier having at least one gain control terminal, means to separate said bursts from said chrominance signal at the output of said amplifier, burst detector means responsive to the amplitude of said separated bursts to apply a direct current output voltage to an amplifier gain control terminal, a source of pulses occurring at the time of said bursts, and a manually operated control coupling a variable amplitude of said pulses to an amplifier gain control terminal, whereby the chrominance output of said amplifier is maintained substantially constant at a level determined by the setting of said manually operated control.

11. In a color television receiver adapted to receive a signal wherein a chrominance signal occurs during line trace time and a deflection synchronizing pulse and a color synchronizing burst occurs during retrace time, an automatic and manual chrominance control comprising, a chrominance and burst amplifier having at least one gain control terminal, means to separate said bursts from said chrominance signal at the output of said amplifier, means responsive to the amplitude of said separated bursts to apply a control signal to an amplifier gain control terminal, means responsive to said deflection synchronizing pulses to generate a pulse occurring at the time of each burst, and a manually operated control coupling a variable amplitude of said pulses to an amplifier gain control terminal, whereby the chrominance output of said amplifier is maintained substantially constant at a level determined by the setting of said manually operated control.

12. In a color television receiver adapted to receive a signal wherein a chrominance signal occurs during line trace time and a color synchronizing burst occurs during retrace time, a chrominance control system comprising, a chrominance and burst amplifier, a burst separator coupled to the output of said amplifier, a burst amplitude detector coupled to the output of said burst separator to provide a control signal output having a duration at least equal to one line trace interval, a source of pulses occurring at the time of said bursts and having a manually controllable amplitude, and means to couple the output of said burst amplitude detector and the output of said source of pulses to said amplifier to control the gain thereof, whereby the chrominance signal ouput of said amplifier is automatically maintained at a level determined by the manually controlled pulses from said source.

References Cited in the file of this patent

UNITED STATES PATENTS

| | | |
|---|---|---|
| 2,757,229 | Larky | July 31, 1956 |
| 2,798,900 | Bradley | July 9, 1957 |

FOREIGN PATENTS

| | | |
|---|---|---|
| 750,492 | Great Britain | June 20, 1956 |

UNITED STATES PATENT OFFICE
CERTIFICATE OF CORRECTION

Patent No. 2,908,748 October 13, 1959

Albert Macovski

It is hereby certified that error appears in the printed specification of the above numbered patent requiring correction and that the said Letters Patent should read as corrected below.

Column 1, line 64, for "is conjunction" read -- in conjunction --; column 5, line 45, for "addition where" read -- addition, --; line 46, after "signals," insert -- where Y --; column 12, line 62, for "siad" read -- said --.

Signed and sealed this 5th day of April 1960.

(SEAL)
Attest:

KARL H. AXLINE
Attesting Officer

ROBERT C. WATSON
Commissioner of Patents